United States Patent [19]

Arcadipane

[11] Patent Number: 5,393,551
[45] Date of Patent: Feb. 28, 1995

[54] MODIFIED MILK CONTAINING A BUTTER FAT SUBSTITUTE WHICH INCLUDES PARTIALLY HYDROGENATED SOYBEAN OIL

[75] Inventor: Pat Arcadipane, Brooklyn, N.Y.

[73] Assignee: Jersey Farms Corp., Charlotte, N.C.

[21] Appl. No.: 756,162

[22] Filed: Sep. 6, 1991

[51] Int. Cl.⁶ ............................................. A23C 9/14
[52] U.S. Cl. ................................. 426/585; 426/580; 426/601
[58] Field of Search ............... 426/601, 607, 585, 587, 426/588, 580, 613

[56] References Cited

U.S. PATENT DOCUMENTS

| | | | |
|---|---|---|---|
| 1,432,633 | 10/1922 | Stevens et al. | 426/585 |
| 3,488,198 | 1/1970 | Bundus | 486/585 |

FOREIGN PATENT DOCUMENTS 2154121  9/1985  United Kingdom .

OTHER PUBLICATIONS

Anonymous, "Substitutes for Whole Milk" Jama vol. 208, No. 9 pp. 7686–7687, 1969.

Modler et al., "Physical and Chemical Slobility of Soybean Oil–Filled Milk" Journal of Food Science, vol. 35 pp. 302–305 1970.

*Primary Examiner*—Carolyn Paden
*Attorney, Agent, or Firm*—Steinberg, Raskin & Davidson

[57] ABSTRACT

A butterfat substitute including a partially hydrogenated soybean oil and a mono- and diglyceride component is added to a variety of dairy products as a substitute for all or part of their normal butterfat component. A modified product having substantially the same taste, body, mouthfeel, and appearance as the corresponding unmodified dairy product which has all of its butterfat component or which has had a portion of its butterfat component removed is obtained which is substantially cholesterol-free and has substantially less saturated fat. In a preferred embodiment, a low saturated fat, substantially cholesterol-free fluid milk product is obtained by combining the butterfat substitute with skim milk. The resultant modified fluid milk product has a substantially extended shelf-life.

14 Claims, No Drawings

MODIFIED MILK CONTAINING A BUTTER FAT SUBSTITUTE WHICH INCLUDES PARTIALLY HYDROGENATED SOYBEAN OIL

FIELD OF THE INVENTION

The present invention is related to a butterfat substitute which may be incorporated in a wide variety of dairy products in place of butterfat.

BACKGROUND OF THE INVENTION

Cholesterol has been implicated by the American Heart Association, the American Medical Association, the Surgeon General and many other medical authorities as a leading cause of heart disease, the number one cause of death in the U.S. More than 64 million Americans are afflicted with heart disease, stroke, or other blood vessel diseases according to the American Heart Association: 1988 Heart Facts. It is well known that the intake of saturated fats causes elevated blood cholesterol in a large segment of the population.

The reduction of saturated fat and cholesterol content in the human diet has thus become an increasingly important goal in modern medicine, especially in view of the preponderance of evidence connecting this component of the diet to increased risk for heart disease, etc. Sixty million Americans, thirty six percent of all adults, need to lower their blood cholesterol because they are at a high risk of coronary disease. (See, e.g., the Jul. 7, 1989 edition of The Journal of the American Medical Association). This is not a problem that affects only adults, however. According to the American Health Foundation, one out of every four children in the U.S. has a cholesterol level that needs to be lowered, and one out of every eight children has a cholesterol level that poses a health risk. The public has become increasing aware of the dangers of cholesterol and saturated fats in their diets.

In addition to the elimination of products containing relatively high levels of saturated fat and cholesterol from the diet, a great deal of attention has been directed to methods of preparing dairy products which have decreased levels of saturated fat and cholesterol.

For example, it is well known that fresh whole cow milk is a desirable food product for human consumption, yet because of its approximately 4 percent milkfat (butterfat) content, it contains high levels of saturated fats and about 30-35 mg cholesterol per 8 oz. serving. The market for fluid milk is enormous. Total milk sales in 1990 in the U.S. were 6.3 Billion Gallons, totaling over $15 Billion Dollars. This is in spite of the fact that milk is in fact, and in the perception of consumers, a leading source of cholesterol in the American diet. Consumers have demonstrated this concern by taking the only action is available to them: a) switching to skim milk or reduced butterfat milk products or b) reducing their total consumption of whole milk.

The development of modified milk products which closely approximate fresh whole milk in taste, body, and appearance, and which are cholesterol-free and have reduced fat content has become increasing important as the above-mentioned alternatives prove to be less than satisfactory. A similar need for the development of other modified dairy products which normally contain butterfat in order to obtain finished dairy products which have reduced fat content and which have lowered cholesterol content or are cholesterol-free, but which closely approximate the unmodified dairy product with respect to taste, texture, mouthfeel, appearance, and total consumption experience is also widely recognized.

It has been possible for some time for dairies to develop a products which are considered to be substantially cholesterol-free. However, removing the cholesterol cost effectively and replicating the taste of whole milk is extremely difficult, and cholesterol-free formulations are constantly introduced which are not satisfactory in this regard.

Milk products having reduced saturated fat content, for example skim milk, are typically prepared by separation of the milkfat from whole milk. The addition of vegetable fat to skim milk produces a milk product generally known as a filled milk product. Skim milk, with or without a vegetable fat additive, may be further processed to make a dried or liquid product.

A dried milk product prepared from skim milk and vegetable fat is described in Howard et. al. U.S. Pat. No. 2,659,676. At least about half of the total fat is palm oil. The product is prepared by heating skim milk to 140° F., adding vegetable fat advantageously with lecithin, pasteurizing at 165° for 15 minutes, homogenizing, and spray drying to produce a dried milk product.

German Offenlegungsschrift 2,444,213 illustrates a dried milk product prepared from a milk of reduced saturated fat content. The milk is evaporated to increase solids concentration, polyunsaturated fat is mixed with the evaporated milk by homogenization, the mixture is optionally re-pasteurized at about 75° to 85° C. until the temperature in the milk tank is uniform, which is said to take about 45 minutes. Thereafter, the mixture is dried to produce a dried milk product. The polyunsaturated fat may include esters of linoleic acid and linolenic acid. The vitamin E-containing product of Example 1 in this reference is claimed to have zero milligrams of cholesterol, and human blood cholesterol levels were said to be decreased.

A canned calcium-enriched milk is described in Bauer U.S. Pat. No. 2,871,123. An edible fat ordinarily is admixed with an emulsifying agent which may be lecithin.

An evaporated milk-like product, prepared directly from powdered skim milk, typically 8 percent vegetable oil and water, is described in Kneeland U.S. Pat. No. 3,011,893. Kneeland heats a mixture of powdered skim milk and water to a temperature of about 120° F., adds vegetable oil, homogenizes, and heat-treats the mixture at 165° to 240° F. (for example at 180° F. for about 5 minutes).

Other filled milk products are described by Bundus U.S. Pat. No. 3,488,198 and Canadian Patent 462,146 (Hauser et. al.).

Bundus describes a filled milk based on the use of a water-in-oil emulsion. His products are said to contain about 0.05-0.5 percent of a water-in-oil emulsifier (rather than a conventional oil-in-water emulsifier); 1-10% fat, and 5-10 percent skim milk solids, the balance being water. The fat is said to be a vegetable fat such as coconut oil, cottonseed oil, palm oil, corn oil, soybean oil, hydrogenated cottonseed oil, hydrogenated soybean oil, peanut oil and olive oil. The filled milk product preferably includes a small amount of cephalin-containing lecithin. Bundus does not suggest that any particular vegetable fats would produce a more beneficial result, and in fact half of his examples use coconut oil, which is frowned upon in low cholesterol diets, as the source of vegetable fat.

The canned, filled milk of the Canadian patent is prepared by vigorously agitating a mixture of skim milk and vegetable oil at a temperature of approximately 210° F. produce an emulsion, and then agitating the mixture under vacuum at a temperature of about 130° F. while introducing vitamins A and D.

SUMMARY OF THE INVENTION

It is accordingly an object of the present invention to provide a butterfat substitute which, when added to a variety of dairy products in place of all or part of the normal butterfat component, provides a modified dairy product having substantially reduced levels of saturated fat, contains substantially less cholesterol or preferably is cholesterol-free, and closely approximates the taste, texture, appearance, and mouthfeel of the unmodified, butterfat-containing product.

It is a further object of the present invention to provide a process for producing a milk product which, unlike skim milk, retains the natural texture, consistency, and flavor of ordinary milk, but without harmful cholesterol.

It is a further object of the present invention to provide a modified milk product which has reduced saturated fat and is substantially cholesterol free, and which closely approximates the taste, body, appearance, and total consumption experience of the milk product which it is replacing.

It is a further object of the present invention to provide a milk product having a substantially increased shelf-life when refrigerated in comparison to fresh whole or lowfat milk.

Additional objects, advantages, and novel features of the present invention are set forth in the description that follows and in part will become apparent to those skilled in the art upon examination of the following description or may be learned by practice of the-invention. The objects and advantages of the invention may be realized and attained by means of instrumentalities and combinations particularly pointed out in the appended claims.

More particularly, in accordance with the above-mentioned objects and others, the present invention is related to a butterfat substitute comprising a mixture of from about 66 to about 98 percent by weight partially hydrogenated soybean oil and from about 2 to about 34 percent by weight emulsifier comprising mono- and diglycerides.

In preferred embodiments, the partially hydrogenated soybean oil component of the butterfat substitute comprises from about 70 to about 80 percent unsaturated fatty acids and from about 20 to about 30 percent saturated fatty acids.

The present invention is also related to a modified fluid milk product which is substantially cholesterol-free and includes substantially less saturated fat than the corresponding unmodified fluid milk product, comprising skim milk and a butterfat substitute comprising a mixture of partially hydrogenated soybean oil and mono- and diglycerides, the butterfat substitute being in a predetermined amount sufficient to provide the milk product with the taste, appearance, texture, and mouthfeel of the corresponding unmodified fluid milk, e.g., 1% lowfat milk, 2% lowfat milk, or whole milk. The modified fluid milk product of the present invention has a substantially increased shelf-life compared to unmodified fluid milk products, e.g., about twice the shelf-life.

The term "lowfat milk" is defined for the purposes of the present invention as encompassing milk having about two percent fat or less Milk generally referred to as "skim milk" is defined as encompassing milk which generally contains less than one percent fat, and generally about 0.05 percent fat. The term "unmodified fluid milk products" is defined for the purposes of the present invention as including both whole milk, lowfat milk, and skim milk.

The present invention is also related to modified milk-based dairy products comprising skim milk and the butterfat substitute of the present invention, the butterfat substitute being in a predetermined amount sufficient to provide the dairy product with the taste, appearance, texture, and mouthfeel of the corresponding unmodified dairy product.

In other preferred embodiments, the butterfat substitute of the present invention which is to be incorporated into the milk-based products of the present invention further comprises from about 1 to about 25 percent non-fat dry milk, by weight.

The present invention is also related to a method for preparing a modified fluid milk product which has substantially reduced saturated fat and is substantially cholesterol-free. In this method, a butterfat substitute comprising from about 66 to about 98 percent partially hydrogenated soybean oil and from about 2 to about 34 percent mono- and diglycerides is prepared. The milkfat is removed from the whole milk to obtain skim milk, and the butterfat substitute is then added to the skim milk in a suitable amount to substitute for all or part of the normal milkfat component of the fluid milk product to obtain a selected lowfat or whole milk-type product. A modified fluid milk product is obtained which has a substantially increased shelf-life, e.g. about twice the shelf-life, has substantially reduced saturated fat, is substantially cholesterol-free, and has substantially the same body, taste, mouthfeel, and appearance in comparison to the corresponding unmodified fluid milk product.

The present invention is also related to a method for preparing a modified fluid milk product which is substantially cholesterol-free, and which has substantially reduced saturated fat. The butterfat substitute of the present invention is prepared and is added to skim milk in a predetermined amount sufficient to provide a modified fluid milk product having substantially the same taste, appearance, body, and mouthfeel of a desired normal fluid milk product classified as lowfat or whole milk. The modified fluid milk product has a substantially increased shelf-life, e.g. about twice the shelf-life, of the normal fluid milk product.

The present invention is further related to a method for preparing a milk-based dairy product having a substantially increased shelf life, comprising removing a predetermined portion of milkfat from the milk component of the dairy product, and thereafter incorporating a suitable amount of the butterfat substitute of the present invention to provide a modified product which has a substantially increased shelf-life compared to the corresponding unmodified product, but which has substantially the same taste, texture, flavor, mouthfeel, etc. as the unmodified selected fluid milk product. The modified milk-based dairy product of the present invention has the further advantages of being substantially cholesterol-free and having substantially less saturated fat than the corresponding unmodified dairy product.

DETAILED DESCRIPTION

The butterfat substitutes of the present invention may replace the animal fats in whole milk, lowfat milk, and milk-containing products with healthier, highly unsaturated vegetable fats. Cholesterol-free milk products which include the butterfat substitutes of the present invention are made with fresh whole milk that has been stripped of all butterfat, leaving a high quality fresh skimmed milk. In order to achieve the full flavor and texture of ordinary milk, animal fat is replaced with a healthier, highly unsaturated vegetable fat based ingredient (no tropical oils). The milk-based products of the present invention are healthier than ordinary milk due to the absence of cholesterol and the significantly lower saturated fat content.

The butterfat substitutes of the present invention may be incorporated into a wide variety of products, e.g. those products which might otherwise include butterfat. Examples of such products include all types of milk and milk-based products such as skim milk, ice cream, yogurt, whipped cream, heavy cream, light cream, light whipping cream cheeses, chocolate, etc.

The finished food products to which the butterfat substitutes of the present invention have been added have substantially the same appearance, consistency, texture, mouthfeel, and taste as the corresponding unmodified product (which includes butterfat), but are superior in food value. The modified fluid milk products of the present invention have a substantial taste and texture advantage over skim milk, while possessing the same advantage of being substantially cholesterol-free.

An important advantage of the present invention is that, in addition to the improved health value, the products prepared using the butterfat substitutes have a surprisingly and substantially increased shelf-life. Many products prepared using the butterfat substitutes of the present invention may last indefinitely. For example, the fluid milk products of the present invention have surprisingly been discovered to have a substantially extended shelf-life compared to ordinary milk.

In addition to the above-mentioned advantages, the milk products of the present invention are still considered to be dairy products, as opposed to non-dairy imitations. They closely approximate the full taste and texture of fresh whole milk. Moreover, they are more easily digested than ordinary milk products. They have also been found to withstand higher temperatures for better recipe cooking, and can be used in all recipes requiring ordinary milk, resulting in the same nutrition, cooking consistency, and flavor.

The fluid milk products of the invention may be formulated to approximate "regular" whole milk, which generally contains 3.25–4.00 percent milkfat, via the incorporation of a amount of butterfat substitute to provide a final product containing a corresponding amount of vegetable fat (i.e., 3.25% vegetable fat) derived from partially hydrogenated soybean oil. Likewise, the milk products of the present invention may be formulated to approximate "1% lowfat" or "2% lowfat" milk, via the incorporation of an amount of butterfat substitute to provide a final product containing a corresponding amount of vegetable fat (i.e., 1% or 2% vegetable fat) derived from partially hydrogenated soybean oil. The fluid milk products are otherwise similar to ordinary fluid milk; they are homogenized, pasteurized, and may be stored under the same conditions. The milk products of the present invention may contain added protein, calcium, vitamins A, D, and E, emulsifiers, nutrients and stabilizers. No chemicals are added to alter any of the natural ingredients.

Comparing the milk products of the present invention with ordinary whole milk, Butterfat is the only unhealthy ingredient in milk. Ordinary whole milk contains 3.25% to 4.00% butterfat, of which approximately 70% is saturated. This represents 33–40 mg of cholesterol per serving. In contrast, the whole milk products of the present invention may contain 3.00% vegetable fat, of which 75% is unsaturated. This represents less than about 2 mg of cholesterol per serving. The whole milk product would include approximately the same calories per serving as ordinary whole milk.

The soybean oil used in the butterfat substitutes of the present invention is preferably partially hydrogenated. By "partially hydrogenated," it is meant that the soybean oil used includes from about 20 to about 30 percent saturated fatty acids and from about 70 to about 80 percent unsaturated fatty acids. Of the unsaturated acids, preferably from about 3 to about 10 percent are polyunsaturated and from about 65 to about 75 percent are mono-unsaturated. The amount of other (caloric) fats are negligible, any remaining caloric fats being classified as saturated after hydrogenation. Pre-hydrogenated soybean oil, in contrast, contains about 15.3 percent saturated fat, about 62.7 percent polyunsaturated fat, and about 22 percent other (caloric) fats (based on Bailey's Fat and Oil Manual).

Alternatively, partially hydrogenated canola oil may be substituted for all or part of the partially hydrogenated soybean oil component of the present invention. Other partially hydrogenated, cholesterol-free vegetable fats known in the art may also be used to substitute for all or part of the partially hydrogenated soybean oil component of the present invention; however, soybean oil is especially preferred.

The soybean oil component of the present invention preferably comprises from about 66 to about 98 percent of the butterfat substitutes of the present invention, and most preferably comprises about 95 percent, by weight.

The mono- and diglyceride component of the present invention preferably comprises from about 2 to about 34 percent of the butterfat substitutes of the present invention, and most preferably about 5 percent, by weight. Other emulsifiers maybe substituted for part of the mono- and diglyceride component of the present invention.

The soybean oil and the mono- and diglyceride components of the butterfat substitutes of the present invention, as well as any other components, should comply with applicable requirements of the Federal Food and Drug Administration, as described in the Code of Federal Regulations.

In making the dairy products of the present invention, it is preferable that skim milk prepared from fresh whole milk be used. However, if desired, the milk products of the present invention can optionally also include nonfat, dry milk solids (powdered skim milk). The nonfat dry milk component may comprise from about 1 to about 25 percent of the butterfat substitutes of the present invention, and in certain embodiments preferably comprise about 16 percent of the butterfat substitute, by weight.

It is most preferred that substantially all butterfat (i.e., milkfat) has been removed from the whole milk. The term "skim milk" whether prepared from fresh whole milk or reconstituted from nonfat dry milk solids, is meant milk containing no more than about 0.1 percent milkfat, desirably no more than about 0.05 percent milkfat. Such skim milk beneficially contains approximately only 1 mg cholesterol per 8 oz. serving.

In certain embodiments, it is desirable to provide a highly nutritious, fortified product. In such cases, nutrients including a protein enhancer such as nonfat, dry milk solids, casein and/or sodium caseinate, and soy protein, lecithin, a calcium enhancer such as calcium hydrate, carrageenan, disodium phosphate, choline, inositol, minerals, and vitamins such as vitamins A, D, and E may be added to the butterfat substitutes of the present invention. Alternatively, some or all of these ingredients may be added to the product after the butterfat substitute has been added.

In preferred embodiments, vitamin E is added in an amount to provide from about 0 to about 25 percent of the U.S.R.D.A., and most preferably about 25 percent of the U.S.R.D.A., per 8 ounce serving.

With regard to the fluid milk products prepared with the butterfat substitutes of the present invention, it has been discovered that the incorporation of the butterfat substitute into, e.g. skim milk, allows the milk to be cooled at higher temperatures. In accordance with the invention, milk products may be prepared by heating a mixture of skim milk and the butterfat substitute with agitation at a temperature above the melting temperature of the fat but less than about 160° F., typically at a temperature of about 130° to about 155° F., and most preferably about 145° F. The heating and agitation are carried out for a time sufficient to promote emulsification and blending. A suitable time for this heating step is about 10 to 20 minutes, with about 12 to 15 minutes being usual for a temperature ranging from about 130° to about 155° F.

Thereafter, the mixture is pasteurized in accordance with any acceptable known process.

Thereafter, a conventional homogenization step is performed which utilizes a pressure of, for example, about 2500 lbs.

The cholesterol-free, processed milk product of the present invention is then cooled below 40° F. and packaged in proper containers suitable, for instance, for fresh whole milk.

The cholesterol-free fluid milk product of the present invention has a taste, mouthfeel, and appearance substantially similar to that of fresh milk, and a body substantially equal to that of the milk product it is designed to replace. An advantage of the milk products of the present invention over fresh milk is that the milk products of the present invention have a surprisingly enhanced shelf life of typically about 20 to 30 days. This advantage is substantial, because the inventive milk product maintains a taste fully equal to that of fresh milk during this period of extended shelf life.

The amount of butterfat substitute included in the finished product depends upon the particular product, the amount of butterfat removed from the product, and the desired taste, texture, mouthfeel, appearance, etc. of the finished modified product. Generally, the amount of butterfat substitute included in the finished product is approximately equal to the amount of butterfat removed from the unmodified product. However, a surprising advantage of the present invention is that the amount of butterfat substitute which is added in order to attain a desired taste, texture, appearance, etc. (i.e., based on the amount of removed milkfat) is less than the amount of milkfat removed. Thus, an even further reduction in the amount of fat content and calories is possible.

Other dairy products of the present invention include a desirable amount of the butterfat substitutes to obtain a taste, mouthfeel, texture, and body substantially similar to the dairy product which contains butterfat. In the case of yogurt, the modified yogurt products of the present invention contain about 3 percent vegetable fat or more (normal yogurt products contain not less than 3.25 percent milkfat). In the case of half-and-half (defined as a mixture of milk and cream having from about 10.5–18% milkfat), the modified products of the present invention preferably contain from about 7 to about 18 percent vegetable fat. The light cream substitutes of the present invention preferably contain from about 13 to about 30 percent vegetable fat, and the whip cream substitutes of the present invention preferably contain at least 13 percent vegetable fat (normal unmodified light cream contains 18–30 percent milkfat, whereas whip cream normally contains not less than 18 percent milkfat). The heavy cream substitutes of the present invention preferably contain at least about 30 percent vegetable fat (heavy cream normally contains at least 36% milkfat). The light whipping cream substitutes of the present invention preferably contain from about 20 to about 36 percent vegetable fat (normal light whipping cream contains 30–36 percent milkfat).

For each of the substitute products of the present invention discussed above, the vegetable fat is derived from partially hydrogenated soybean oil. Of course, the above list is not meant to be exclusive, and one skilled in the art would recognize many other dairy products which can be treated in accordance with the present invention.

DETAILED DESCRIPTION OF THE PREFERRED EMBODIMENTS

The following examples are given to further illustrate the present invention. The scope of the invention is not, however, meant to be limited to the specific details of the examples.

EXAMPLES 1–3

Modified Fluid Milk Products

In Example 1, 846 lbs (100 gallons) of Grade A skim milk in accordance with the present invention, prepared from fresh whole milk, is added to a mixing vat and heated to a temperature of 130 to 135° F. Thereafter, 26 lbs of partially hydrogenated soybean oil, 1 lb of a mixture of natural mono- and diglyceride emulsifier, is added to the mixing vat and the resulting mixture is heat-treated at a temperature of 130° to 155° F. with agitation for 12 to 15 minutes.

Afterwards, the resulting mixture is subjected to pasteurization, e.g., to a heat treatment at 175° for 15 to 20 minutes, and homogenized at a pressure of 2500 lbs.

The partially hydrogenated soybean oil component of the butterfat substitute used in Example 1 is commercially available as "Van den Bergh D31 TM" (Formerly available as "Durkee D31 TM"). It includes 26% saturated fat, and 74% unsaturated fat (of which 3–6% may be polyunsaturated fat).

The mono- and diglyceride component used has the following specifications: about 40–45 percent 1-monoglyceride content; a melting point of about 145°–150° F.; an acid value of about 4 (maximum); arsenic in the amount of 3 ppm (maximum); about 2 percent free glycerin; about 10 ppm maximum heavy metals (as Pb); an iodine value of 5.0 (maximum); about 0.5 percent residue on ignition (maximum), as determined by using procedures set forth in Food Chemicals Codex III. The mono- and diglyceride component should test negative for *E. coli* and Salmonella and have a maximum of about 10,000/g APC, about 500/g yeast; and about 500/g mold, as determined by A.O.A.C. and/or B.A.M. procedures. A suitable commercially available product is available as "GMS ™" from Germantown Manufacturing Company, Broomall, Pa.

The resultant product is a cholesterol-free, fortified fluid milk product and comprises which consists of 97.9 percent Grade A skim milk, and 2.1 percent of the butterfat substitute of the present invention (2.1 percent soybean oil and 0.1 percent mono- and diglycerides).

Suitable amounts of nutrients including soy protein, calcium hydrate, carrageenan, vitamin E (in an amount sufficient to provide 25 percent of the U.S.R.D.A. per 8 oz serving), disodium phosphate, lecithin, choline, inositol, minerals, and vitamins A & D mixture (General Mills, Gensol #10)) may also be incorporated to obtain a fortified product.

The resultant modified whole milk product of Example 1 has substantially the same taste, body, appearance, and mouthfeel as regular whole milk, but is substantially cholesterol-free.

Example 2 is prepared in the same manner as Example 1, except that 17.5 lbs of partially hydrogenated soybean oil and 1 lb of a mixture of natural mono- and diglyceride emulsifier are added to 846.5 lbs of Grade A skim milk to prepare a 2% lowfat cholesterol-free fluid milk product. The resultant modified lowfat milk product of Example 2 has substantially the same taste, body, appearance, and mouthfeel as regular 2% lowfat milk, but is substantially cholesterol-free.

Example 3 is prepared in the same manner as Example 1, except that 17.5 lbs of partially hydrogenated soybean oil, 1 lb of a mixture of natural mono- and diglyceride emulsifier, and 3.5 lbs. of non-fat dry milk solids are added to 865 lbs of Grade A skim milk to prepare a 2% lowfat cholesterol-free fluid milk product. The resultant modified lowfat milk product of Example 3 has substantially the same taste, body, appearance, and mouthfeel as regular 2% lowfat milk, but is substantially cholesterol-free.

The cholesterol-free, fortified, processed, fresh milk products of Examples 1–3 are then cooled, packaged in plastic and paper containers, and maintained below 40° F. The shelf-life of the product is about 20–30 days.

Nutritional information concerning representative fortified milk products of Examples 1 and 2 is provided in Table 1:

TABLE 1

| | NUTRITIONAL INFORMATION | |
|---|---|---|
| Item | Whole (3.25%) Milk EXAMPLE 1 | Low-fat (2%) Milk EXAMPLE 2 |
| Serving Size | One cup | One cup |
| Calories | 155 | 135 |
| Protein | 10 grams | 10 grams |
| Carbohydrates | 11 grams | 11 grams |
| Fat | 8 grams | 5 grams |
| Sodium | 120 milligrams | 120 milligrams |
| U.S.R.D.A. | | |
| Protein | 30 | 30 |
| Vitamin A | 10 | 10 |
| Vitamin C | 4 | 4 |
| Thiamine | 6 | 6 |
| Riboflavin | 25 | 25 |

TABLE 1-continued

| | NUTRITIONAL INFORMATION | |
|---|---|---|
| Item | Whole (3.25%) Milk EXAMPLE 1 | Low-fat (2%) Milk EXAMPLE 2 |
| Niacin | 0 | 0 |
| Calcium | 30 | 30 |
| Iron | 0 | 0 |
| Vitamin D | 25 | 25 |
| Vitamin E | 25 | 25 |

The composition of the partially hydrogenated soybean oil used in the butterfat substitute of Examples 1–3 is set forth in Table 2 below:

TABLE 2

| Number of Carbon atoms/number of double bonds | Acid | Percent |
|---|---|---|
| 8:0 | Caprylic | 0.1 |
| 12:0 | Lauric | 0.4 |
| 14:0 | Myristic | 0.2 |
| 16:0 | Palmitic | 10.8 |
| 16:1 | Palmitoleic | 0.1 |
| 17:0 | Margaric | 0.1 |
| 18:0 | Stearic | 13.8 |
| 18:1 | Oleic | 68.2 |
| 18:2 | Linoleic | 5.8 |
| 18:3 | Linolenic | 0.1 |
| 20:0 | Araehidic | 0.4 |

The examples provided above are not meant to be exclusive. Many other variations of the present invention would be obvious to those skilled in the art, and are contemplated to be within the scope of the appended claims.

What is claimed is:

1. A modified milk containing a butter-fat substitute in the place of unmodified milk butterfat while having the taste and feel of unmodified milk with the same amount of butterfat and having substantially greater shelf life than the unmodified milk, said modified milk comprising non-fat dry or fluid milk and a butterfat substitute in an amount sufficient to provide the texture and feel of unmodified milks containing from 1 percent to 4 percent butterfat, said butterfat substitute comprising a mixture of from about 66 to about 98 percent by weight partially hydrogenated soybean oil comprising from about 70 to 80 percent unsaturated fatty acids including linoleic acid in an amount of about 5.8%, and from about 20 to about 30 percent saturated fatty acids, and from about 2 to about 34 percent by weight mono- and diglycerides, said modified milk having an extended shelf like of about 20–30 days.

2. The modified milk of claim 1, wherein said partially hydrogenated soybean oil comprises about 74 percent unsaturated fatty acids and about 26 percent saturated fatty acids.

3. The modified milk of claim 1, wherein said partially hydrogenated soybean oil has the following composition: about 0.1% caprylic acid, about 0,4% lauric acid, about 0.2%. myristic acid, about 10.8% palmitic acid, about 0.1% palmitoleic acid, about 0.1% margaric acid, about 13.8% stearic acid, about 68.2% oleic acid, about 5.8% linoleic acid, about 0.1% linolenic acid, and about 0.4% araehidic acid.

4. The modified milk of claim 1, comprising from about 1 percent to about 25 percent nonfat dry milk, by weight.

5. A cholesterol-free, fluid milk product having an extended shelf-life of 20–30 days, comprising skim milk, and a butterfat substitute comprising a mixture of from about 66 to about 98 percent partially hydrogenated soybean oil comprising from about 70 to 80 percent unsaturated fatty acids including linoleic acid in an amount of about 5.8 percent, and from about 20 to about 30 percent saturated fatty acids, and from about 2 to about 34 percent mono- and diglycerides, by weight, said butterfat substitute being in an amount sufficient to provide a modified fluid milk product having substantially the same taste, appearance, body, and mouthfeel of a desired normal fluid milk product classified as lowfat or whole milk, said modified fluid milk product having a substantially increased shelf-life of 20–30 days compared to said normal fluid milk product.

6. The modified fluid milk product of claim 5, wherein said partially hydrogenated soybean oil comprises about 95 percent and said mono- and diglycerides comprise about 5 percent of said butterfat substitute.

7. The modified fluid milk product of claim 5 which contains a suitable amount of said butterfat substitute to provide a product having substantially the same taste, appearance, body, and mouthfeel of 1% lowfat milk.

8. The modified fluid milk product of claim 5 which contains a suitable amount of said butterfat substitute to provide a product having substantially the same taste, appearance, body, and mouthfeel of 2% lowfat milk.

9. The modified fluid milk product of claim 5 which contains a suitable amount of said butterfat substitute to provide a product having substantially the same taste, appearance, body, and mouthfeel of whole milk.

10. A method for preparing a cholesterol-free, fluid milk product having substantially the same taste, appearance, body, and mouthfeel of a selected normal lowfat or whole milk product, comprising preparing a butterfat substitute comprising from about 66 to about 98 percent of said partially hydrogenated soybean oil comprising from about 70 to about 80 percent unsaturated fatty acids including linoleic acid in an amount of about 5.8 percent, and from about 20 to about 30 percent saturated fatty acids, and from about 2 to about 34 percent mono- and diglycerides, by weight, mixing a predetermined amount of said butterfat substitute with skim milk to provide a modified fluid milk product having substantially the same taste, appearance, body, and mouthfeel of said selected normal lowfat or whole milk product, which is substantially cholesterol-free, and includes substantially less fat than said selected normal fluid milk product.

11. The product prepared according to the method of claim 10.

12. A method for preparing a modified dairy product which is substantially cholesterol-free, has a substantially reduced saturated fat content, while maintaining substantially the same taste, appearance, body, and mouthfeel of the unmodified dairy product, comprising preparing a butterfat substitute comprising from about 66 to about 98 percent of said partially hydrogenated soybean oil comprising from about 70 to about 80 percent unsaturated fatty acids including linoleic acid in an amount of about 5.8 percent, and from about 20 to about 30 percent saturated fatty acids, and from about 2 to about 34 percent mono- and diglycerides, by weight, removing the normal butterfat component of a dairy product, and thereafter adding a predetermined amount of said butterfat substitute to said dairy product to obtain a modified dairy product having a desired taste, appearance, body, and mouthfeel substantially the same as the corresponding unmodified dairy product which has all of its butterfat component or which has had a portion of its butterfat component removed, said modified dairy product being substantially cholesterol-free having substantially less saturated fat than the corresponding unmodified dairy product and having a shelf life of 20–30 days, which is substantially increased as compared to the unmodified dairy product.

13. The product prepared by the method of claim 12 which is a modified yogurt product, a modified ice cream product, a modified cheese product, a modified chocolate product, a modified whipped cream product, a modified heavy cream product, or a modified light whipping cream product.

14. A method for substantially increasing the shelf-life of fluid milk products comprising preparing a butterfat substitute comprising from about 66 to about 98 percent of said partially hydrogenated soybean oil comprising from about 70 to about 80 percent unsaturated fatty acids including linoleic acid in an amount of about 5.8 percent, and from about 20 to about 30 percent saturated fatty acids, and from about 2 to about 34 percent mono- and diglycerides, by weight, mixing a predetermined amount of said butterfat substitute with skim milk to provide a modified fluid milk product having substantially the same taste, appearance, body, and mouthfeel of a selected normal lowfat or whole milk product, said modified fluid milk product being substantially cholesterol-free, including substantially less fat, and having a shelf-life of 20–30 days which is substantially increased as compared to said selected normal fluid milk product.

* * * * *